(12) United States Patent
Wrigley

(10) Patent No.: US 6,997,435 B2
(45) Date of Patent: Feb. 14, 2006

(54) VALVE ASSEMBLY

(75) Inventor: Andrew Nicholson Wrigley, Auckland (NZ)

(73) Assignee: ITW New Zealand Limited, Auckland (NZ)

( * ) Notice: Subject to any disclaimer, the term of this patent is extended or adjusted under 35 U.S.C. 154(b) by 0 days.

(21) Appl. No.: 10/800,026

(22) Filed: Mar. 15, 2004

(65) Prior Publication Data
US 2004/0238778 A1 Dec. 2, 2004

(30) Foreign Application Priority Data
Mar. 27, 2003 (NZ) .................... 524996

(51) Int. Cl.
F16L 37/28 (2006.01)
(52) U.S. Cl. ............... 251/149.6; 251/331; 137/510
(58) Field of Classification Search .............. 251/331, 251/149.6; 137/510
See application file for complete search history.

(56) References Cited

U.S. PATENT DOCUMENTS

| 5,711,507 A | 1/1998 | Berget et al. |
| 5,730,418 A | 3/1998 | Feith et al. |
| 6,293,293 B1 | 9/2001 | Wrigley et al. |
| 6,378,742 B1 | 4/2002 | Rohr et al. |
| 2003/0155546 A1 * | 8/2003 | Browne et al. ............. 251/331 |

FOREIGN PATENT DOCUMENTS

| GB | 2223830 | 4/1990 |
| JP | 09287442 | 11/1997 |
| NZ | 329181 | 5/1998 |
| WO | 97/42438 | 11/1997 |

* cited by examiner

Primary Examiner—David J. Walczak
Assistant Examiner—Peter deVore
(74) Attorney, Agent, or Firm—Lowe Hauptman & Berner, LLP

(57) ABSTRACT

A valve assembly to avoid or minimise the effect of "compression setting" which occurs when valves control the flow of some hazardous and/or corrosive fluids, especially when at en elevated temperature. The valve assembly includes a valve stem having a head portion which engages with a valve seat in order to close and seal the valve and an elastically deformable portion. In order to allow fluid to flow through the valve, the elastically deformable portion of the valve stem is deformed to allow fluid to pass between the head portion and the valve seat. An additional biasing element such as a cylindrical or conical compression spring is provided to urge the head portion towards contact with the valve seat. In this way, should "compression setting" of the elastic portion of the valve stem take place, the additional spring will ensure that the valve head is still able to be engaged with the valve seat to thereby close the valve.

24 Claims, 3 Drawing Sheets

VALVE ASSEMBLY

TECHNICAL FIELD

This invention relates to valve assemblies and in particular though not solely to spring-loaded self closing valve assemblies used in the flow path of fluids.

BACKGROUND ART

In fluid flow control systems where the fluid is highly corrosive or hazardous it is extremely important that fluid does not escape from its storage container (or from any conduit connected to the storage container) where it may then come into contact with the user. It is particularly important that the connection between storage container and conduit be well sealed when the conduit is removed from connection with the container. In such cases it is common to incorporate a flow control valve in the outlet of the storage container which closes upon disconnection of the outlet conduit. An example of this type of system is disclosed in our prior New Zealand Patent No. 329181 in which the outlet conduit is provided with a fitting having a protrusion which, upon connection to the outlet of the storage container, presses down on the head of the valve stem assembly thereby opening the valve and allowing fluid to flow from the container to the conduit (or vice versa). The valve stem within the valve includes an elastically deformable portion which, upon the conduit connector being removed, provides the required restorative force to move the head of the valve stem back against the valve seat to thereby close the valve.

Valves of the above described type are used in the storage and flow control of hazardous and/or corrosive fluids which may be held at elevated temperatures. Because the valve seat of the valve is often submerged in the fluid the elastic properties of the deformable portion of the valve stem may, over time, deteriorate. This deterioration of elastic properties can eventually lead to a condition known as "compression setting" in which the valve seat assumes its deformed shape in its normal, unbiased position. In other words, the elastic portion of the valve stem permanently assumes a deformed shape akin to the shape that it would normally assume during the open state of the valve. Once compression setting has occurred, the valve will not completely seal in the closed position thus causing undesirable leaking of the potentially harmful fluid as mentioned above.

It is therefore an object of the present invention to provide a valve assembly which will go at least some way towards overcoming the above disadvantage or will provide the industry with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art in any country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

Accordingly, in a first aspect, the invention consists in a valve assembly comprising:
  a valve body including a valve seat surrounding a valve outlet,
  a valve stem having a head portion adapted to contact and form a seal with the valve seat when the valve is in a closed state, the valve stem having an elastically deformable portion which is deformed when the valve is in the open position thereby providing a restorative force to bias the head portion towards contact with the valve seat, and
  additional biasing means mounted between the valve body and the valve stem to urge the head portion towards contact with the valve seat.

Preferably, the valve stem comprises a substantially cylindrical portion having at one end the valve head portion and at the other end a flared portion which forms the elastically deformable portion.

Preferably, the flared portion is substantially cup or hemispherically shaped.

Preferably, the valve stem is hollow with a closed end at the head portion and the additional biasing means is mounted within the valve stem.

Preferably, the additional biasing means comprise a spring means.

Preferably, the spring means is a helical compression spring having a valve body end with a larger diameter than a valve head end so that the valve head end of the spring means fits within the valve stem and contacts the closed end portion and the valve body end of the spring means contacts mounting means within the valve body.

Alternatively, the spring means is a substantially cylindrical helical compression spring having a diameter smaller than the inside diameter of the cylindrical portion of the valve stem and the valve body includes mounting means on which a support plate is mounted which supports the valve body end of the spring means.

Preferably the support plate comprises a circular disk having an angular ridge on one side surface, the support plate also supporting the open end of the valve stem and including a central post over which the valve body end of the spring means is positioned.

Preferably, the support plate has a diameter substantially equal to the outside diameter of the flared portion of the valve stem and an annular ridge is provided on the valve stem side of the support plate, the annular ridge having an outside diameter substantially equal to the inner diameter of the flared portion so that the flared portion is supported at the outer edge of the support plate.

Preferably, the annular ridge has an outwardly sloped outer surface.

Preferably, the valve body comprises an upper plate in which the valve outlet is provided and a support frame which suspends the mounting means of the support plate beneath the valve opening.

Preferably, the support frame comprises at least three support posts extending substantially perpendicularly from the upper plate, the distal ends of adjacent support posts connected by joining members which form said support means for said support plate.

In a second aspect, the invention consists in combination, in a fluid outlet port including the valve assembly according to the first aspect, and an outlet conduit connector adapted for connection to the outlet port, wherein the outlet conduit connector includes an engagement element which engages with the valve stem head and moves the valve to the open position.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

The valve assembly according to the present invention is an improvement upon the valve assembly described in our New Zealand patent specification No.329181, the contents of which is herein incorporated by reference.

Figure 1:
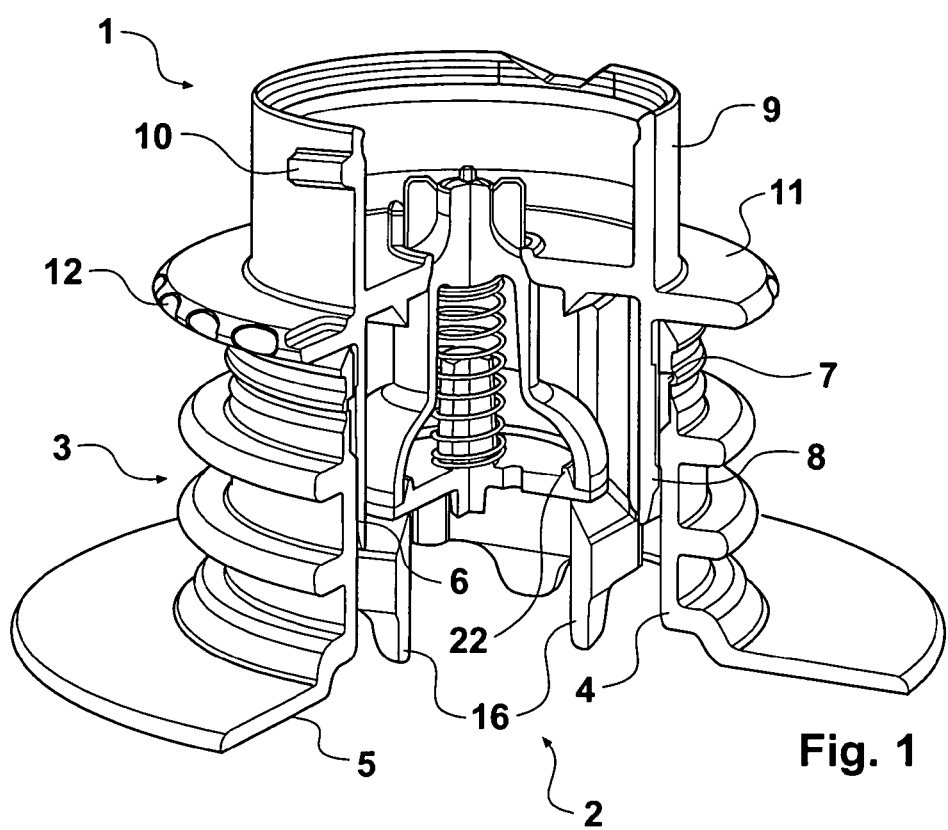
FIG. 1 is a partially sectioned perspective view showing the valve assembly according to the present invention in a closed state.
Figure 2:
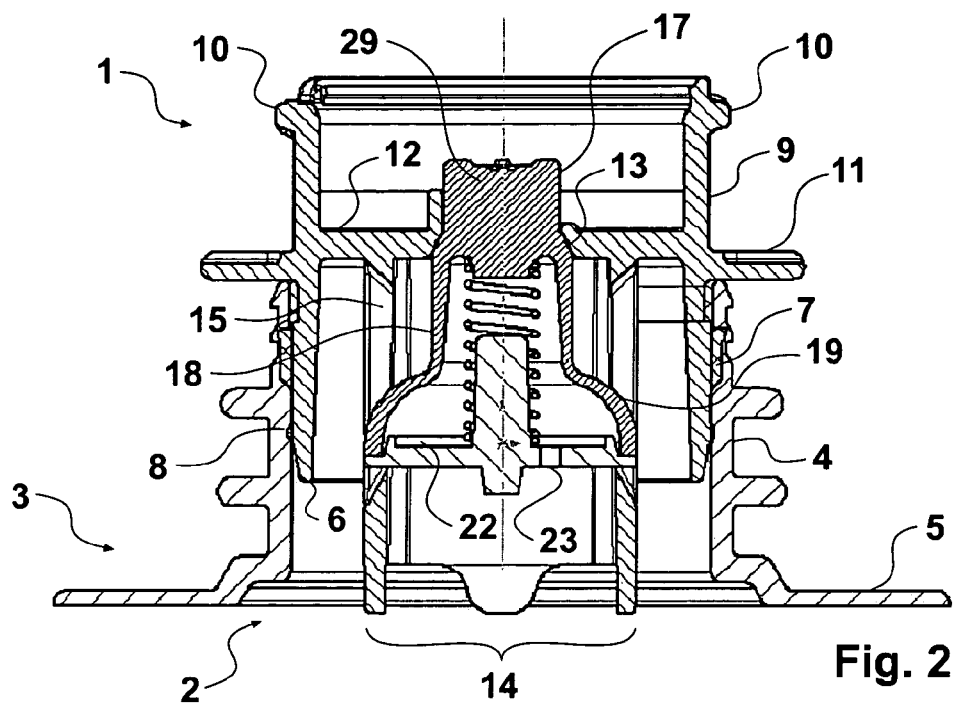
FIG. 2 is a cross-sectional front elevational view showing the valve assembly of FIG. 1 in a closed state.

With reference to the drawings and initially in particular FIGS. 1 and 2, a storage container outlet port 1 includes a valve body 2 and a storage container outlet fitting 3. The storage container outlet fitting 3 includes a substantially cylindrical outlet port mounting section 4 and a flange portion 5 which is heat sealed, glued or otherwise bonded, moulded or formed integrally with a storage container (not shown) which is adapted to hold a fluid. As previously mentioned, the stored fluid may be corrosive, poisonous or generally hazardous and may be heated to an elevated temperature.

The valve body 2 includes a substantially cylindrical wall section 6 which fits snugly within the outlet port mounting section 4 of outlet fitting 3. The cylindrical wall section 6 may be a "push-fit" within the outlet fitting 3 and co-operating engaging features are provided on the mating surfaces of the two components to ensure that a seal is provided and that the valve body may easily be inserted within the outlet fitting but that removal of the valve body is relatively difficult. For example, as shown in the drawings, the outer surface of the cylindrical wall section 6 is provided with a upwardly flared annular rib 7 and a sealing rib 8 while the inner surface of outlet port mounting section 4 is provided with corresponding mating grooves or depressions. Alternatively, the valve body 2 and storage container outlet fitting 3 could be glued, heat sealed or otherwise bonded or even integrally moulded or formed. The valve body 2 and storage container outlet fitting 3 are preferably moulded from a plastics material such as linear low-density polyethylene.

The upper end of the valve body 2 is provided with a cylindrical outlet port fitting 9 which is dimensioned so as to be received within a corresponding mating fitting on an outlet conduit connector (not shown) which is screwed down into connection with the outlet port 1 via the partial thread projections 10. Manual tightening of the outlet conduit connector to the outlet port 1 is assisted by the provision of a flange 11 which extends from the outlet port fitting 9 and which is provided with indentations 12 around its circumference to improve a user's grip.

Figure 3:
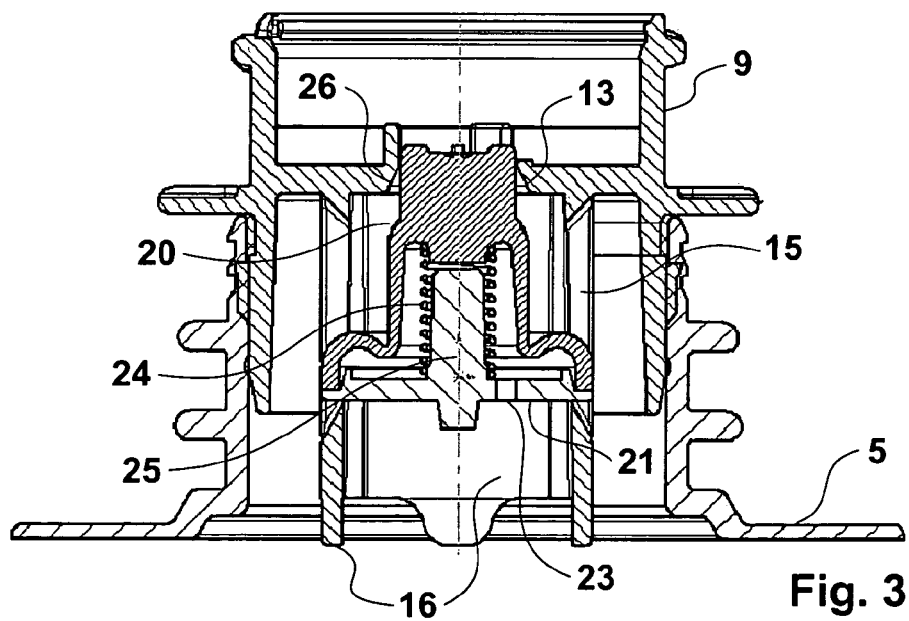
FIG. 3 is a cross-sectional front elevational view showing the valve assembly of FIG. 1 in an open state.

With reference now to FIG. 3, an end or upper plate 12 partially closes off the valve body 2 so that fluid may not flow through (that is, into or out of) the outlet port fitting 9. A valve seat 13 is formed around a circular valve opening 26 in end plate 12. The surface of the valve seat 13 is preferably substantially conical or generally tapered inwards, towards the centre of the valve opening, and outwards, towards the outlet conduit connector side of the valve body.

Figure 5:
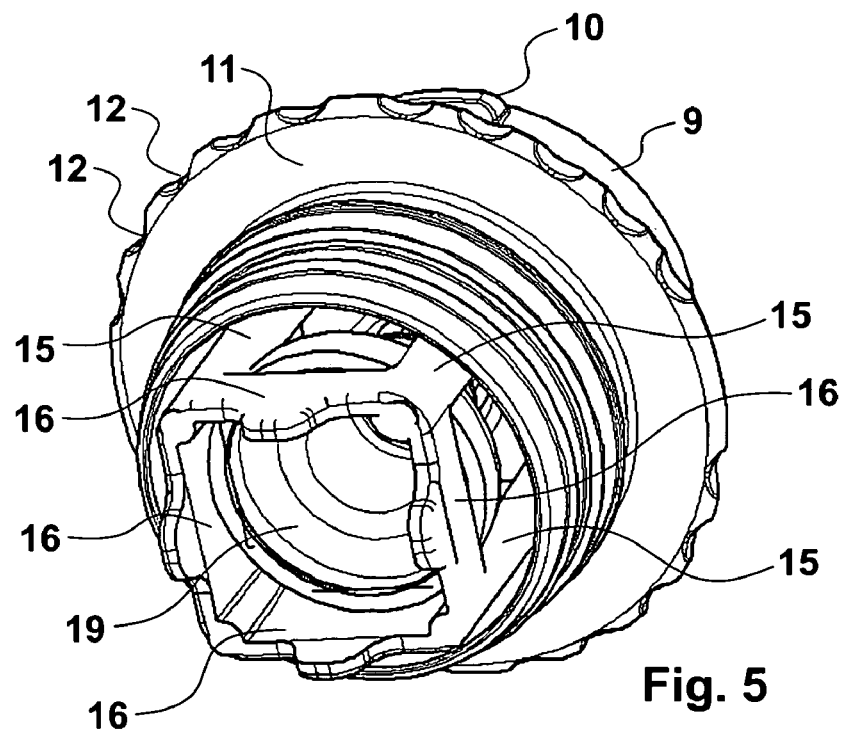
FIG. 5 is a perspective view from below and one side of the valve assembly of FIG. 1 with the storage container outlet fitting, spring and support disk removed for clarity.

Suspended beneath end plate 12 is a support frame 14 on which the valve mechanism (soon to be described) is supported. The support frame is concentric with the valve opening 26 and valve seat 13 and comprises at least three (four are shown) support members or posts 15 projecting from the inner surface of end plate 12 and equally spaced about the valve opening 26. For example, if three support posts were provided then they would be spaced in an equilateral triangle pattern. In the example shown, four support posts 15 are provided, each of them at the corner of a square. This is most clearly shown in FIG. 5 which is a perspective view from beneath and one side. The lower or distal ends of adjacent support posts 15 are connected by joining members 16. Accordingly, rectangular shaped windows are formed bounded on opposite sides by adjacent support posts 15, on top by end plate 12, and beneath by a joining member 16. The windows allow fluid to flow easily through the support structure which is preferably moulded integrally with the valve body 2.

A valve stem 17 is provided within the valve body to selectively shut off or allow the flow of fluid through the valve. The valve stem is made from an elastomeric material such as a copolymer of ethylene and vinyl acetate (EVA) so that it is elastically deformable. The valve stem 17 includes a substantially cylindrical upper portion 18 and a flared or substantially cup or hemispherically shaped lower portion 19. The substantially cylindrical upper portion 18 of the valve stem is provided with an annular valve face 20 having a complimentary shape to that of the valve seat 13 in order to provide a good seal when the valve assembly is in its closed position. It can be seen in FIG. 3 that the valve assembly is in an open state as the upper portion of the valve stem has been displaced downwards, thereby separating the valve face 20 from the valve seat 13 so that fluid may flow through the valve opening 26.

It can be seen that valve stem 17 has a solid head section 29 although much of the substantially cylindrical portion 18 and the flared lower portion 19 are open from below and accordingly much of the valve stem is hollow. Because the valve stem is made from an elastically deformable material, the application of an external force to the head 29 of the valve stem will result in the deformation of the valve stem at or around the join between the cylindrical and flared portions (as shown in FIG. 3). The central portion of the valve seat therefore acts as a diaphragm whereby deformation of the valve stem allows the valve face 20 to disengage from the valve seat 13 so that fluid may pass through valve opening 26. Because the valve stem is elastically deformable, it's deformation provides a restorative force to the valve head, urging the valve face into engagement with the valve seat. That is, the valve assembly is of the "normally closed" variety.

A support plate or circular disk 21 is provided substantially parallel to end plate 12 but supported on joining members 16 of the support frame 14. In the embodiment shown, disk 21 has a diameter substantially equal to the diagonal of the square formed by the support posts 15 so that segments of the disk rest upon and are supported by the joining members 16.

Figure 4:
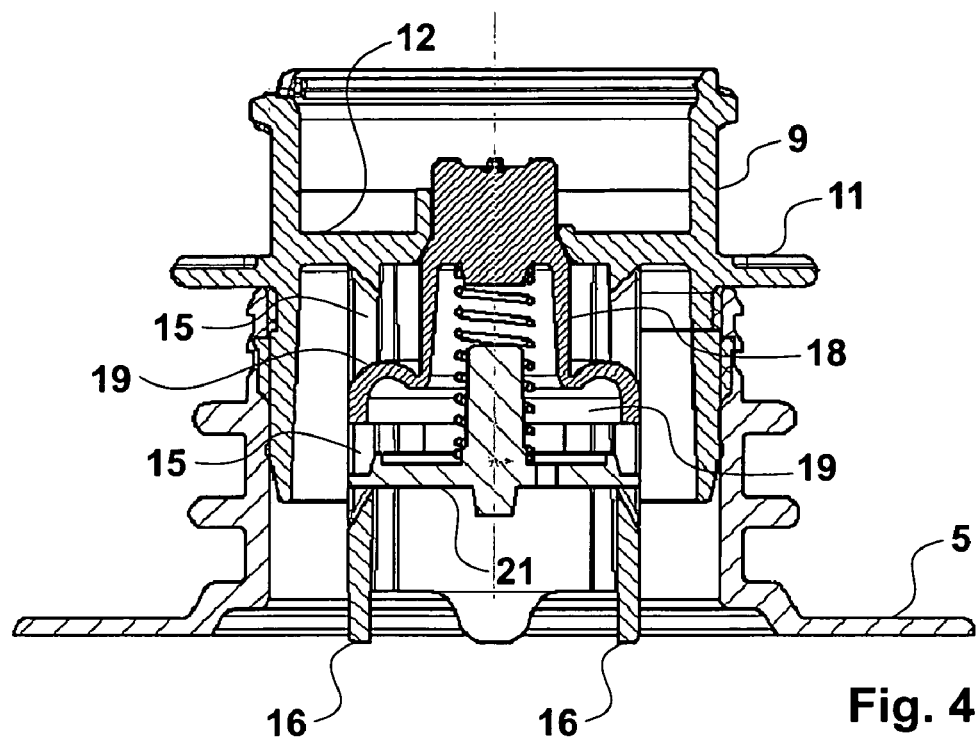
FIG. 4 is a cross-sectional front elevational view showing the valve assembly of FIG. 1 in a closed state once compression setting of the valve stem has taken effect.

As can be seen in FIGS. 2 to 4, the outer diameter of the flared portion 19 of valve stem 17 matches the diameter of disk 21. To aid in positioning the lower end of the valve stem on the disk, an annular ridge 22 with a sloped outer edge may be provided on the disk's upper surface. In order to allow fluid within the hollow interior of the valve stem to be evacuated upon deformation, the disk is provided with a fluid flow port or hole 23.

As mentioned above, the internal workings of the valve assembly are occasionally or permanently immersed in potentially corrosive fluid which may be at an elevated temperature. Under these conditions, the elastic properties of the valve seat may change and, over time, compression setting could occur so that in the valve's closed state (as shown in FIG. 1), the valve seat could assume a deformed shape as its "normal", unbiased configuration. As deformation of the valve seat reduces its effective length, this results in displacement of the valve face away from the valve seat allowing fluid to pass out of the valve opening 26 even when no external force is applied to the head of the valve stem.

In order to overcome this difficulty, the valve assembly according to the present invention also includes an additional biasing means 24 between the disk 21 and the head of the valve stem 17. The additional biasing means may be a spring means such as a cylindrically shaped helical compression spring as shown in the drawings. The cylindrical spring may be held in position by its lower end being mounted over a mounting means, for example post 25 which protrudes from the upper surface of disk 21 and its upper end surrounding a circular protrusion from the underside of the valve stem head. Alternatively, spring means 24 may comprise a tapered helical compression spring having a larger base diameter than its tip diameter. The diameter of the base end of the tapered spring could be made to fit with the annular ridge 22 of disk 21 or could be equal to the inside diameter of the base of the flared portion of the valve stem. Alternatively, the additional biasing means could be any type of elastically deformable substance, so long as it does not suffer from compression setting.

FIG. 4 shows the valve assembly according to the present invention in its closed state after the onset of compression setting in the valve stem. It can be seen that the spring 24 is providing a backup closing force to the restorative closing force usually applied by the elastically deformable valve stem so that the valve opening 26 is sealed despite the valve seat having undergone a permanent change in shape. Furthermore, because of the presence of the additional biasing means 24, continued opening and closing cycles of the valve assembly will be possible while still maintaining a fluid-tight seal of the valve opening each time the valve assumes its closed position. Eventually, the valve stem could be replaced but the present invention allows replacement to be delayed or avoided.

It has been found that once compression setting of the valve stem has taken place, only a small closing force is required to seal the valve opening 26 and therefore it is possible for a low cost and relatively small helical spring to be used as the additional biasing means 24.

Aspects of the present invention have been described by way of example only and it should be appreciated that modifications and additions may be made thereto without departing from the scope thereof as defined in the appended claims.

What is claimed is:

1. A valve assembly, comprising:
   a valve body including a valve seat surrounding a valve outlet;
   a valve stem having a head portion adapted to contact and from a seal with the valve seat when the valve assembly is in a closed state, the valve stem having an elastically deformable portion which is deformed when the valve assembly is in an open position thereby providing a restorative force to bias the head portion towards contact with the valve seat; and
   additional biasing means mounted between the valve body and the valve stem to urge the head portion towards contact with the valve seat;
   wherein
   the additional biasing means comprise a substantially cylindrical helical compression spring having a diameter smaller than an inner diameter of a substantially cylindrical portion of the valve stem;
   the valve body further includes mounting means on which a support plate is mounted;
   the support plate supports a valve body end of the spring;
   the valve body further comprises an upper plate in which the valve outlet is provided and a support frame which suspends the mounting means of the support plate beneath the valve outlet; and
   the support frame comprises at least three support posts extending substantially perpendicularly from the upper plate, distal ends of adjacent said support posts being connected by joining members which form said mounting means for said support plate.

2. A valve assembly as claimed in claim 1, wherein the valve stem comprises at one end of the substantially cylidrical portion the head portion and at the other end a flared portion which forms the elastically deformable portion.

3. A valve assembly as claimed in claim 2, wherein the flared portion is substantially cup or hemispherically shaped.

4. A valve assembly as claimed in claim 1, wherein the valve stem is hollow with a closed end at the head portion and the spring is mounted within the valve stem.

5. A valve assembly as claimed in claim 4, wherein a valve head end of the spring fits within the valve stem and contacts the closed end of said valve stem and a valve body end of the spring contacts the support plate.

6. A valve assembly as claimed in claim 5, wherein the support plate comprises a circular disk which supports an open end of the valve stem and a central post over which the valve body end of the spring is positioned.

7. A valve assembly, comprising:
   a valve body including a valve seat surrounding a valve outlet;
   a valve stem having a head portion adapted to contact and form a seal with the valve seat when the valve assembly is in a closed state, the valve stem having an elastically deformable portion which is deformed when the valve assembly is in an open position thereby providing a restorative force to bias the head portion towards contact with the valve seat; and additional biasing means mounted between the valve body and the valve stem to urge the head portion towards contact with the valve seat;

wherein the valve stem further comprises a substantially cylindrical portion having at one end the head portion and at the other end a flared portion which forms the elastically deformable portions;

the additional biasing means comprise a substantially cylindrical helical compression spring having a diameter smaller than an inner diameter of the substantially cylindrical portion of the valve, stem;

the valve body further includes mounting means on which a support plate is mounted;

the support plate supports a valve body end of the spring; and the support plate has a diameter substantially equal to an outer diameter of the flared portion of the valve stem and an annular ridge is provided on a valve stem side of the support plate, the annular ridge having an outer diameter substantially equal to an inner diameter of the flared portion so that the flared portion is supported at an outer edge of the support plate.

8. A valve assembly as claimed in claim 7, wherein the annular ridge has an outwardly sloped outer surface.

9. A valve assembly as claimed in claim 7, wherein the valve body comprises an upper plate in which the valve outlet is provided and a support frame which suspends the mounting means of the support plate beneath the valve outlet.

10. A valve assembly as claimed in claim 7, wherein the flared portion is substantially cup or hemispherically shaped.

11. A valve assembly as claimed in claim 7, wherein the valve stem is hollow with a closed end at the head portion and the spring is mounted within the valve stem.

12. A valve assembly as claimed in claim 11, wherein a valve head end of the spring fits within the valve stem and contacts the closed end of said valve stem and a valve body end of the spring contacts the support plate.

13. A valve assembly as claimed in claim 12, wherein the support plate comprises a circular disk which supports an open end of the valve stem and a central post over which the valve body end of the spring is positioned.

14. In combination, a fluid outlet port including a valve assembly and an outlet conduit connector adapted for connection to the outlet port, wherein the valve assembly comprising:

a valve body including a valve seat surrounding a valve outlet;

a valve stem having a head portion adapted to contact and form a seal with the valve seat when the valve assembly is in a closed state, the valve stem having an elastically deformable portion which is deformed when the valve assembly is in an open position thereby providing a restorative force to bias the head portion towards contact with the valve seat; and an additional biasing element mounted between the valve body and the valve stem to urge the head portion towards contact with the valve seat; and the outlet conduit connector includes an engagement element which, when the outlet conduit connector is connected to the outlet port, engages with the head portion of the valve stem and moves the valve assembly to the open position.

15. A combination as claimed in claim 14, wherein the valve stem comprises a substantially cylindrical portion having at one end the head portion and at the other end a flared portion which forms the elastically deformable portion.

16. A combination as claimed in claim 15, wherein the flared portion is substantially cup or hemispherically shaped.

17. A combination as claimed in claim 15, wherein the additional biasing element is a helical compression spring baying a diameter smaller than an inside diameter of the substantially cylindrical portion of the valve stem; and the valve body includes a mounting element and a support plate which is mounted on said mounting element and supports a valve body end of the spring.

18. A combination as claimed in claim 17, wherein the support plate comprises a central post over which the valve body end of the spring is positioned.

19. A combination as claimed in claim 17, wherein the support plate has a diameter substantially equal to an outer diameter of the flared portion of the valve stem and an annular ridge is provided on a valve stem side of the support plate, the annular ridge having an outer diameter substantially equal to an inner diameter of the flared portion so that the flared portion is supported at an outer edge of the support plate.

20. A combination as claimed in claim 19, wherein the annular ridge has an outwardly sloped outer surface.

21. A combination as claimed in claim 19, wherein the valve body comprises an upper plate in which the valve outlet is provided and a support frame which suspends the mounting element and the support plate beneath the valve outlet.

22. A combination as claimed in claim 21, wherein the support frame comprises at least three support posts extending downwardly from the upper plate, distal ends of adjacent said support posts being connected by joining members which form said mounting element for said support plate.

23. A combination as claimed in claim 14, wherein the valve stem is hollow with a closed end at the head portion and the additional biasing element is mounted within the valve stem.

24. A combination as claimed in claim 14, wherein the additional biasing element is a helical compression spring having a valve body end with a larger diameter than a valve head end thereof.

* * * * *